United States Patent [19]

Choffin

[11] Patent Number: 4,508,467

[45] Date of Patent: Apr. 2, 1985

[54] TELESCOPICALLY EXTENDABLE POLE

[76] Inventor: Justin C. Choffin, 211 El Nopal, Green Valley, Ariz. 85614

[21] Appl. No.: 476,213

[22] Filed: Mar. 17, 1983

[51] Int. Cl.³ .......................... F16B 7/14; A01K 97/00
[52] U.S. Cl. ..................... 403/104; 43/17.2; 403/351
[58] Field of Search .................. 43/17.2; 403/104, 351, 403/352

[56] References Cited

U.S. PATENT DOCUMENTS

| | | | |
|---|---|---|---|
| 2,906,050 | 9/1959 | Foster | 43/17.2 |
| 2,948,077 | 8/1960 | Karpes | 43/17.2 |
| 2,950,558 | 8/1960 | Karpes | 43/17.2 |
| 3,667,788 | 6/1972 | Greenwood | 403/104 |
| 3,693,280 | 9/1972 | Calhoun | 43/17.2 |
| 3,861,071 | 1/1975 | Nordhagen | 43/17.2 |
| 3,953,138 | 4/1976 | Hine | 403/104 |
| 4,086,718 | 5/1978 | Swanson | 43/17.2 |
| 4,180,346 | 12/1979 | Blake | 403/109 |
| 4,294,560 | 10/1981 | Larkin | 403/104 |
| 4,324,502 | 4/1982 | Pickles | 403/104 |

*Primary Examiner*—Gene P. Crosby
*Attorney, Agent, or Firm*—Cahill, Sutton & Thomas

[57] ABSTRACT

The present invention includes a telescopically extendable pole including a first hollow cylindrical tube and a second cylindrical tube which is telescopically displaceable within the first tube. The arrangement for selectively locking the first and second tubes together at a fixed relative longitudinal position includes a locking member having first and second cylindrical end sections and a cylindrical center section which functions as a first camming surface. A second camming surface surrounds the first camming surface. Relative rotational displacements of the first tube with respect to the second tube causes the first camming surface to engage the second camming surface and the second camming surface to cause engagement with the inner surface of the first tube to lock the first and second tubes into a fixed relative longitudinal position.

1 Claim, 15 Drawing Figures

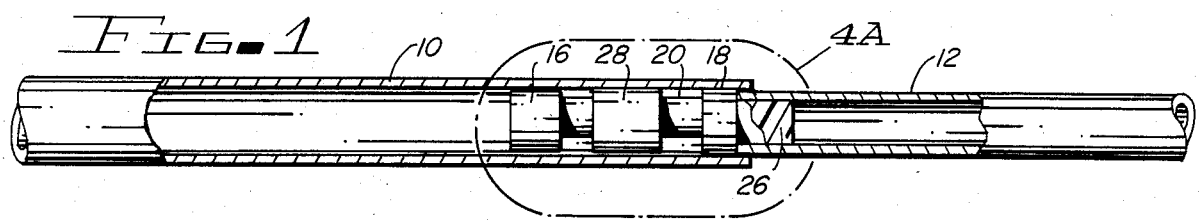
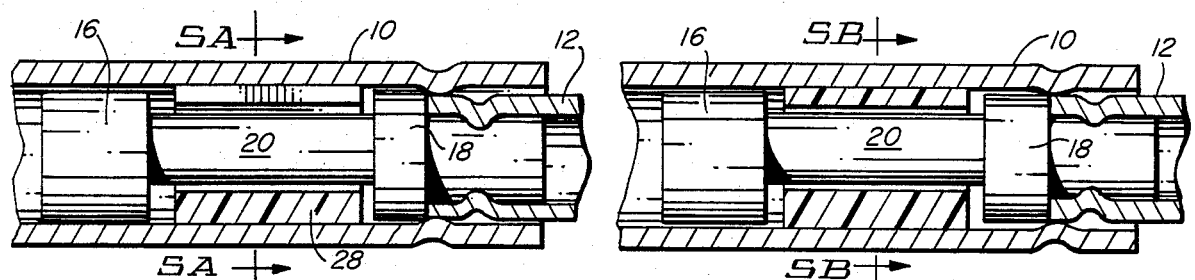
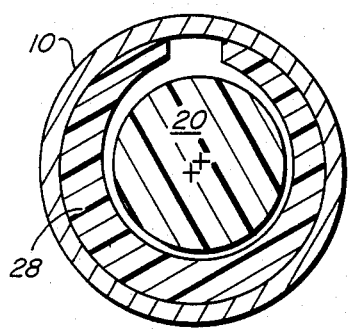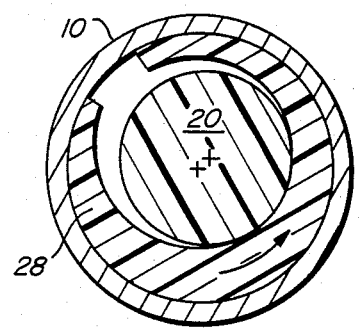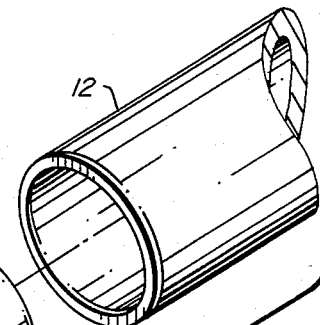
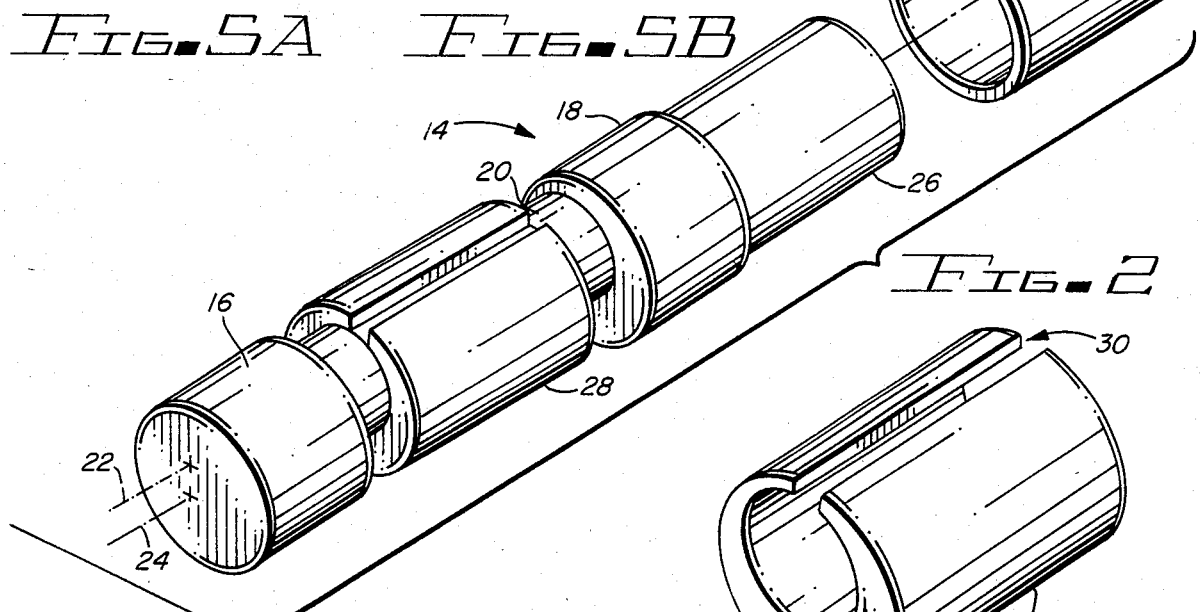

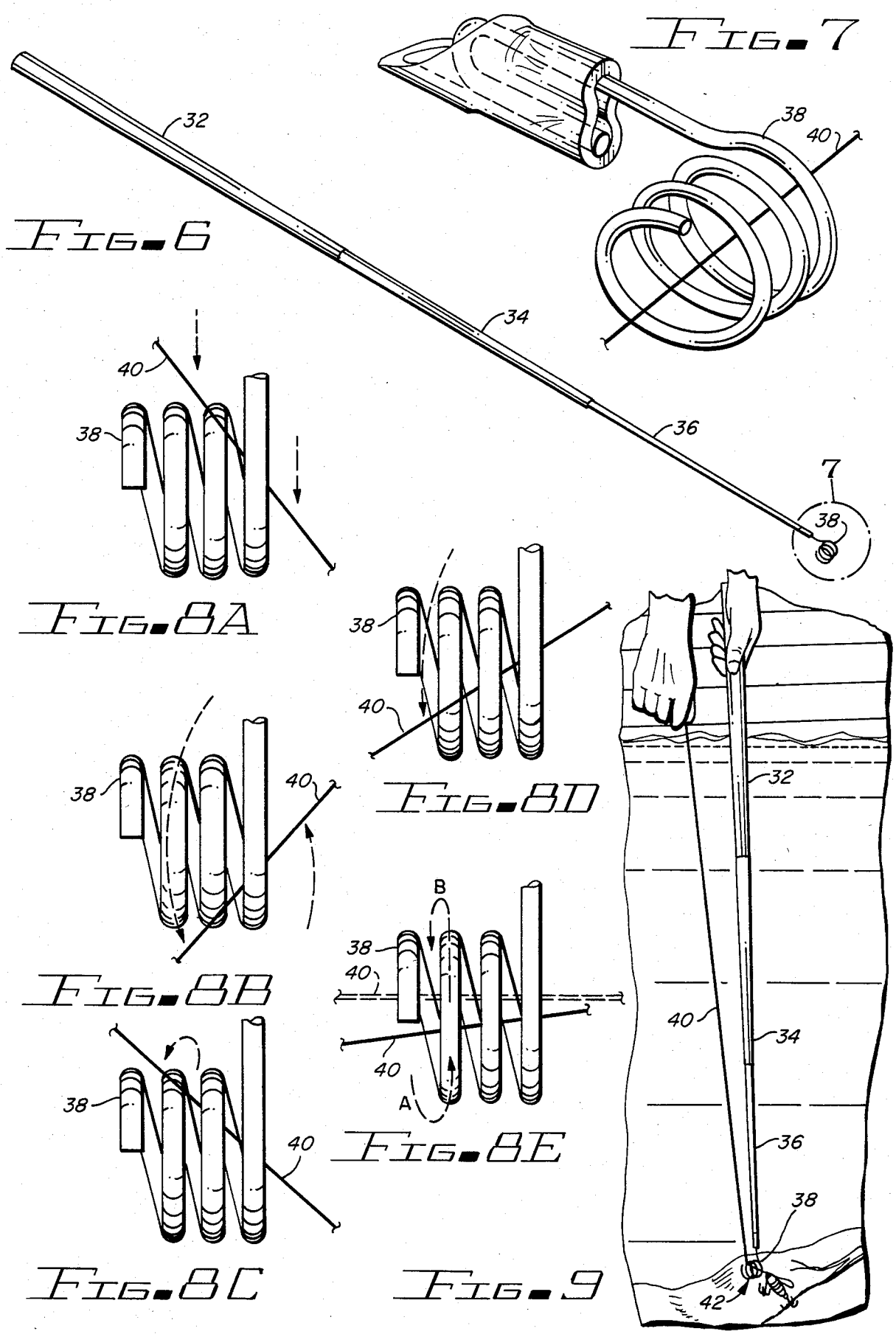

TELESCOPICALLY EXTENDABLE POLE

BACKGROUND OF THE INVENTION

1. Field of the Invention

This invention relates to telescopically extendable poles, and more particularly, to telescopically extendable poles having a cam-type locking device.

2. Description of the Prior Art

The prior art discloses a wide variety of lure retriever devices.

U.S. Pat. No. 4,086,718 (Swanson) discloses a telescopic device for retrieving fishing lures. The lower end of a larger diameter telescopic rod includes a threaded exterior surface. A smaller diameter telescopic rod fits within the interior of the larger diameter rod. A split locking ring includes a bevelled outer surface which interfaces with a knurled lock nut. Tightening of the knurled lock nut compresses the locking ring causing the diameter of the ring to be decreased. The inner surface of the locking ring is angled and the compressive forces exerted by the lock nut through the locking ring onto the smaller diameter telescopic rod lock the two telescopically adjustable rod sections into a fixed longitudinal position. A lure retriever snare is coupled to the lower end of the telescopically adjustable pole. Rotation of the telescopically adjustable pole causes the snare to engage a fishing line. The specific increasing radius coil utilized on the Swanson fishing lure retriever device permits the exposed outer end of the snare to become entangled in the fishing line which may result in destruction of the fishing line rather than retrieval of a snagged lure. The mechanical complexity of the telescopic pole locking means is evident from an inspection of the Swanson patent.

U.S. Pat. No. 2,950,558 (Karpes) discloses a fishing lure retriever which includes a fishing line capturing device and a non-telescopic sectionalized pole which is assembled by coupling three pole units together end to end.

U.S. Pat. No. 2,948,077 (Karpes) discloses a fishing lure retrieving device having an umbrella-like telescopic rod including a fishing line capturing device.

U.S. Pat. No. 3,693,280 (Calhoun) discloses a fishing lure retrieving device having a telescopically extendable rod which is locked in the extended position by a plurality of detents and sockets. An eyelet attached to the end of the telescopic rod couples the rod to the fishing line while a burlap lined head engages the hooks of the fishing lure.

U.S. Pat. No. 4,180,346 (Blake) discloses a coupling device for telescoping members which includes a complex, spring biased locking member. Longitudinal displacement of the housing which surrounds the telescopic junction of two adjacent rod sections determine the locked/unlocked configuration of the locking coupling unit.

U.S. Pat. No. 3,805,435 (Serrill) discloses yet another version of a fishing lure retriever which includes a weight which is slideably secured to a fishing line. A guide line is coupled to the weight to control the sliding movement of the lure retriever relative to the fishing line.

SUMMARY OF THE INVENTION

It is therefore a primary object of the present invention to provide a lure retriever having a locking device which is positioned within the interior of first and second telescopically adjustable rods.

Another object of the present invention is to provide a lure retriever having a locking device which can be activated by a small relative rotational displacement of the first and second rods to either lock or unlock the two rods to either prevent or permit telescopic displacements of the two rods.

Still another object of the present invention is to provide a lure retriever having a locking device which utilizes first and second camming surfaces to rigidly secure the locking device to the interior of the larger diameter rod of a pair of telescopically adjustable rods.

Yet another object of the present invention is to provide a lure retriever having a locking device coupled to the end of the smaller diameter rod of a pair of telescopic rods and which slides up and down along the interior of the larger diameter rod and which can lock the larger and smaller rods together at any desired telescopic position.

Still another object of the present invention is to provide a lure retriever having a locking device for a telescopically adjustable pole which includes a helical coil snare device which can be readily coupled to a fishing line for the purpose of dislodging a snagged fishing lure.

Briefly stated, and in accord with one embodiment of the invention, a telescopically extendable pole includes a first hollow cylindrical tube having an inner diameter and a second cylindrical tube having a first end and an outer diameter smaller than the inner diameter of the first tube to permit telescopic displacements of the second tube within the first tube. Means for selectively locking the first and second tubes together at a fixed relative position includes a locking member having first and second cylindrical end sections and a cylindrical center section functioning as a first camming surface. The locking means of the present invention also includes a second camming surface. Relative rotational displacements of the first tube with respect to the second tube causes the first camming surface to engage the second camming surface and the second camming surface to engage the inner surface of the first tube to lock the first and second tubes into a fixed relative longitudinal position.

DESCRIPTION OF THE DRAWINGS

The invention is pointed out with particularity in the appended claims. However, other objects and advantages together with the operation of the invention may be better understood by reference to the following detailed description taken in connection with the following illustrations, wherein:

FIG. 1 is a partially cutaway side view of the locking device for the lure retriever of the present invention, particularly depicting the manner in which the locking device is secured to and functions within the telescopic inner section of the two cylindrical rods.

FIG. 2 is a partially cutaway exploded perspective view of the primary elements of the locking device of the present invention.

FIG. 3 is a perspective view of the collar or second camming surface which assists in performing the locking function of the locking device of the present invention.

FIGS. 4A–4B are enlarged section views of the central section of the locking device depicted in FIG. 1.

FIGS. 5A-5B are sectional views, taken along section line 5A—5A and 5B—5B of the locking device depicted in FIGS. 4A and 4B, respectively.

FIG. 6 is a perspective view of the entire fishing lure retriever including a unique helical snare design.

FIG. 7 is a partially cutaway enlarged view of the helical snare depicted in FIG. 6.

FIGS. 8A-8E comprise a sequential series of depictions illustrating the manner in which a fishing line is threaded around the helical snare until it is totally positioned within the interior of the snare.

FIG. 9 depicts the manner in which the telescopic lure retriever device can be utilized to detach a snagged fishing lure from a submerged obstacle.

DESCRIPTION OF THE PREFERRED EMBODIMENT

In order to better illustrate the advantages of the invention and its contributions to the art, a preferred hardware embodiment of the invention will now be described in some detail.

Referring initially to FIGS. 1, 2 and 3, the locking device of the present invention includes a first hollow cylindrical tube 10 which is telescopically fitted to a second cylindrical tube 12. A locking member 14 includes a first cylindrical end section 16 and a second cylindrical end section 18 and a reduced diameter cylindrical center section 20 which is located between the first and second end sections. The longitudinal axis indicated by dotted line 22 of cylindrical center section 20 is offset from the longitudinal axis 24 of end sections 16 and 18 of locking member 14. In the specific embodiment of the invention depicted, the outer portion of second cylindrical end section 18 takes the form of a reduced diameter plug 26 having a diameter approximately equal to the inner diameter of the first end of second cylindrical tube 12 of permit plug 26 to be rigidly coupled to cylindrical tube 12.

Locking member 14 is typically fabricated from a hard, but low friction plastic material to facilitate rotation of tube 12 with respect to tube 10. During rotational displacements of this type, end sections 16 and 18 of locking member 14 serve as varying surfaces to maintain the appropriate relative alignment between tubes 10 and 12 and locking member 14. The offset between longitudinal axis 24 and longitudinal axis 22 of cylindrical center section 20 causes cylindrical center section 20 to function as a first camming surface during rotational displacements between tubes 10 and 12.

The second camming surface or collar 28 is typically fabricated from a low friction material such as plastic, Teflon or another material having equivalent low friction properties and flexibility. Collar 28 includes a lengthwise notch or aperture designated by reference number 30 which permits collar 28 to be expanded sufficiently to be inserted to a position surrounding the cylindrical center section 20 of locking member 14. Collar 28 includes a substantially cylindrical outer surface with a longitudinal axis aligned with the longitudinal axis of locking member 14 as indicated by reference number 24. Collar 28 further includes a substantially cylindrical inner surface with a longitudinal axis offset from the longitudinal axis of the outer surface of collar 28. The outer diameter of the outer surface of collar 28 is approximately equal to the inner diameter of tube 10.

In the preferred embodiment of the invention, collar 28 is fabricated such that its outer diameter is slightly greater than the inner diameter to tube 10 to enable the outer surface of collar 28 to exert an outward biasing force against the inner cylindrical surface of tube 10 when locking member 14 and collar 28 are inserted into the interior of tube 10. This outward biasing force exerts a frictional force between the outer surface of collar 28 and the inner surface of tube 10 such that relative rotational displacement of tube 10 with respect to tube 12 causes relative rotational displacement between the cylindrical center section 20 of locking member 14 and collar 28. Such relative rotational displacement between these two members of the locking means of the present invention causes the longitudinal axis of the outer cylindrical surface of collar 28 to be displaced relative to longitudinal axis 22 of locking member 14.

Relative rotational displacement between tubes 10 and 12 cause the longitudinal axis 22 of cylindrical center section 20 to rotate relative to the longitudinal axis 24 which is maintained in a fixed position. Due to the outward biasing frictional force between collar 28 and the inner surface of tube 10, collar 10 tends to be maintained in either a non-rotating configuration or in a rotational position which lags the positive rotational displacement of locking member 14. The resulting rotational displacement between locking member 14 and collar 28 causes a camming effect between the eccentrically positioned cylindrical center section 20 and the eccentrically positioned cylindrical inner surface of collar 28 and causes an increasing outward biasing force to be exerted by the cylindrical center section 20 of locking means 14 through collar 28 onto the cylindrical interior wall of tube 10 which very quickly results in forces of a sufficiently high radially outward orientation that tubes 10 and 12 become locked together and can no longer be radially displaced with respect to one another. In the preferred embodiment of the invention, it has been found that relative rotational displacements between tubes 10 and 12 on the order of 120° or less are completely sufficient to rigidly lock together tubes 10 and 12 such that they can no longer be rotationally displaced with respect to one another nor can they be displaced telescopically with respect to one another.

A transition from the locked condition described immediately above into an unlocked position wherein tubes 10 and 12 can readily be telescopically collapsed or extended is readily effected by merely rotating tubes 10 and 12 in an opposite direction in an amount approximately equal to the amount of rotation which was required to lock the two telescopic tubes together.

FIG. 4 illustrates an enlarged view of the locking device depicted in FIG. 1. FIG. 5 represents a cross sectional view of the locking device depicted in FIG. 4, taken along section line 5—5.

It will be readily apparent that the locking device disclosed above can be used to lock two telescopically adjustable cylindrical elements together in a fixed relative longitudinal position. Such a locking device could therefore be used to lock together the telescopically extendable legs of a photographic tripod, a collapsible fishing pole, a golf ball retriever, a lure retriever or any other device having one or more telescopically adjustable elements. FIGS. 6-9 illustrate one specific application of the locking device of the present invention to a telescopically adjustable rod for retrieving fishing lures snagged on an underwater obstruction. In this particular application, a telescopically extendable rod includes a first section 32, a second reduced diameter section 34 and a third reduced diameter section 36. When not in use, telescopic elements 34 and 36 of the lure retriever can be collapsed into a position within first section 32 of the device. In the preferred embodiment of the invention, section 32 is fabricated from 0.035 inch wall thickness aluminum tubing having an outer diameter of ⅝" and an inner diameter of ½". The overall length of each section of the lure retriever is on the order of 36". It will be readily apparent to one of ordinary skill in the art that any embodiment of the locking device invention could be fabricated from a variety of different metal, plastic or other related materials and that the dimensions of the tubing with respect to length, diameter and wall thickness could be varied at will. In the embodiment of the invention depicted in FIG. 1, section 36 of the pole includes a ⅜" outer diameter aluminum rod having a ¼" inner diameter. Section 36 of the telescopic pole could readily be fabricated either from a hollow cylindrical tube or from a solid tube. In the solid center embodiment of tube 36, the second cylindrical end section 18 of locking member 14 could be directly coupled to the solid end surface of section 36 by a wide variety of securing means such as a threaded rod, a strong adhesive or one of many other different types of fastening means of the type well known to one of ordinary skill in the art. In the alternative, the end of telescopic pole section 36 could include a cylindrical recess for receiving the reduced diameter plug 26 which is depicted in FIG. 2. Various other well known types of coupling configurations could also be used for securing end 18 of locking member 14 to tube section 36 of the telescopic pole.

The snare 38 is coupled to the opposite end of telescopic pole section 36. Snare 38 is formed in the shape of a helical coil having an inner diameter on the order of one to one and one half inches. In the preferred embodiment of the invention, snare 38 is fabricated from nine gauge galvanized wire.

FIGS. 8A-E depict the manner in which a fisherman attaches snare 38 to a continuous length of fishing line which is coupled at one end to a fishing pole and to the opposite end to a snagged fishing hook or lure. Fishing line 40 is positioned as depicted in 8A and then circulated around the helically oriented coils of snare 38 in a clockwise direction as indicated in sequential drawing FIGS. 8-A through 8-E. After the fishing line has been wrapped in a clockwise direction around snare 38 when snare 38 is positioned as illustrated in FIG. 8, fishing line 40 ends up totally enclosed within the helical windings of snare 38. Snare 38 can now be readily displaced back and forth along the length of fishing line 40. In this configuration, the fisherman totally extends the telescopic sections of the lure retriever and permits snare 38 to guide the telescopically extendable rod beneath the surface of the water along fishing line 40 until snare 38 abuts the snagged lure which is designated in FIG. 9 by reference number 42. At this point, the fisherman generally holds the telescopic pole more or less parallel to the orientation of the snagged line and exerts a force on a lure retriever pole in a direction parallel to the orientation of fishing line 40. The exertion of a force in this direction generally forces the snagged lure hook in a direction opposite to the direction which caused the snag, thus freeing the lure, hook or other device from the snag.

After the lure retrieving operation has been completed, the fisherman circulates fishing line 40 around snare 38 in a direction opposite to that depicted in 8A-8E which totally separates fishing line 40 from snare 38. The two locking devices of the type depicted in FIGS. 1 and 2 are now unlocked by appropriate rotational displacements of telescopic rod sections 32 and 34 and 34 and 36 to permit section 36 and 34 to be telescoped back into the interior of rod section 32. This substantially reduced length fishing lure retriever device is then stored in an appropriate place.

It has been found that the unique cam-actuated locking device disclosed above can be fabricated and assembled inexpensively and is extremely reliable and durable in service. The device includes essentially only a single moving part (collar 28) which can be readily actuated to either lock or unlock adjacent telescopic rod sections. In addition, it has been found that the specific and highly unusual configuration of helically wound snare 38 can be quickly coupled to fishing line 40 and will not become detached unless the user takes the specific action depicted in FIG. 8 to decouple snare 38 from fishing line 40.

It will be apparent to those skilled in the art that the disclosed locking device and fishing lure retriever incorporating the locking device plus a unique snare may be modified in numerous ways and may assume many embodiments other than the preferred forms specifically set out and described above. For example, the length and relative diameters of the various elements of the locking means such as cylindrical center section 20 and the second camming surface or collar 28 in particular, could be modified in many different ways without departing from the spirit and scope of the invention. In particular, collar 28 could be made substantially shorter in overall length, could include a substantially reduced inner diameter, or might even be configured to resemble a donut having an appropriately positioned, eccentrically disposed central aperture. Numerous different types of related modifications of the invention would readily be apparent to one of ordinary skill in the art and would not to any extent depart from the true spirit and scope of the invention disclosed above. Accordingly, it is intended by the appended claims to cover all such modifications of the invention.

I claim:
1. A telescopically extendable pole comprising:
   a. a first hollow cylindrical tube having an inner diameter;
   b. a second cylindrical tube having a first end and an outer diameter smaller than the inner diameter of said first tube to permit telescopic displacements of said second tube within said first tube; and
   c. means for selectively locking said first and second tubes together at a fixed relative position including:
      i. a locking member including first and second cylindrical end sections having aligned longitudinal axes and a diameter substantially equal to the inner diameter of said first tube to continuously frictionally engage the inner wall of said first tube along said end sections to thereby serve as a load bearing extension of said second tube within said first tube, said second end section being rigidly coupled to the first end of said second tube to transfer loads from said first tube to said second tube, said locking member further comprising a reduced diameter cylindrical center section positioned between said first and second end sections and having a longitudinal axis offset from the longitudinal axis of said first and second end sections to cause said center section to function as a first camming surface as said first tube is rotationally displaced with respect to said second tube; and ii. a second camming member fabricated from a plastic material having a substantially cylindrical outer wall, a longitudinal axis aligned with the longitudinal axis of the first and second end sections of said locking member, and a substantially cylindrical inner wall with a longitudinal axis offset from the longitudinal axis of said outer wall, said inner wall having a second camming surface surrounding the center section of said locking member, said second camming member including an outer diameter substantially equal to the inner diameter of said first tube, said inner wall exceeding the diameter of said first camming surface to provide a low friction interface between said first and second camming surfaces, and a lengthwise notch located in the thinnest section of the wall of said second camming surface and extending along the entire length of said second camming surface, the outer wall of said second camming member being spring biased against the inner wall of said first tube to provide a circumferentially continuous high friction interface between the outer wall of said second camming member and the inner wall of said first tube;

whereby rotational displacements of said first tube with respect to said second tube causes said first camming surface to immediately engage said second camming surface and said outer wall of said second camming member to further apply pressure to said friction interface with the inner surface of said first tube to lock said first and second tubes into a fixed relative longitudinal position.

* * * * *